Figure 1:
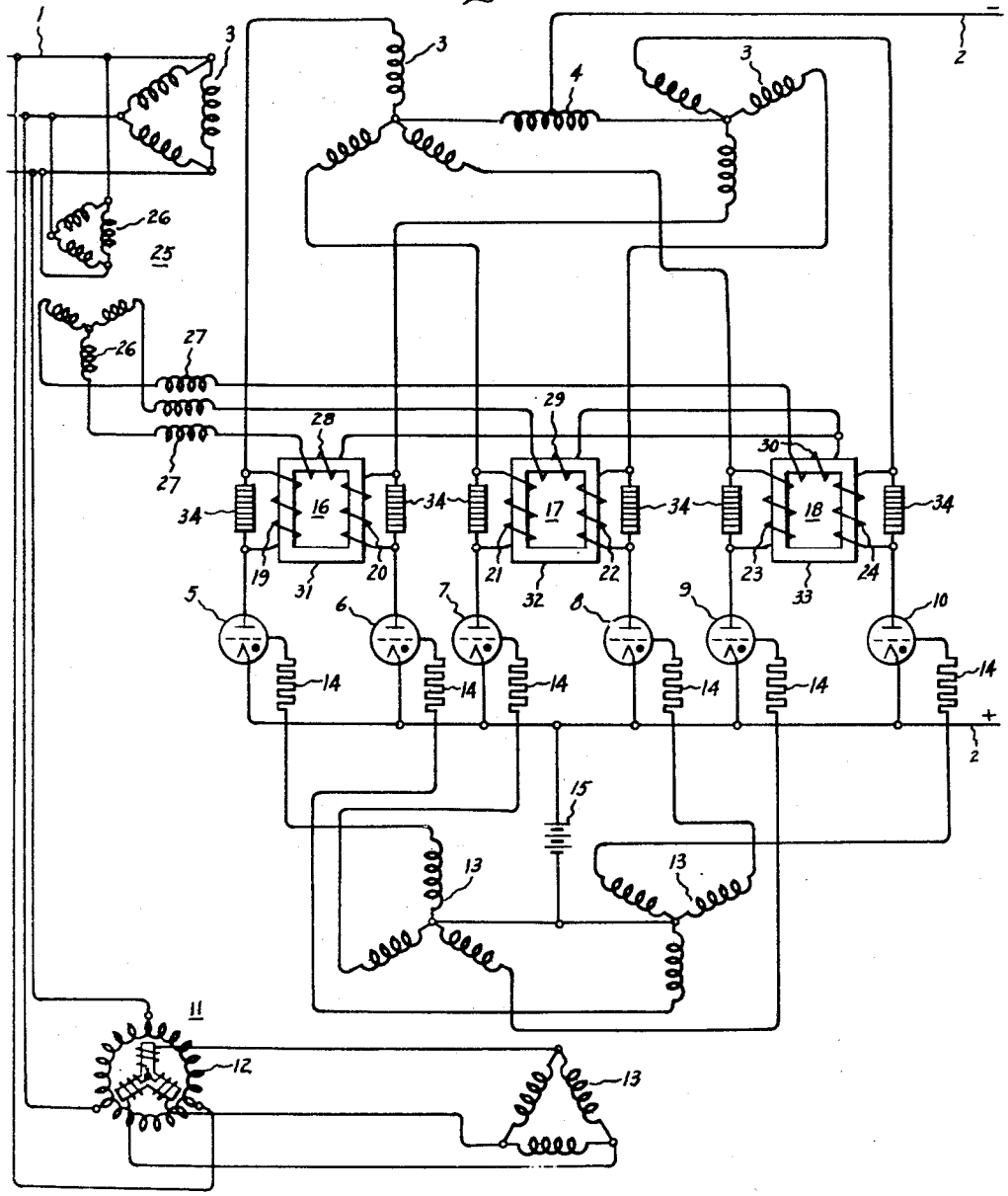

April 10, 1951 B. D. BEDFORD 2,548,579
CONTROL CIRCUITS FOR ELECTRIC CONVERTING SYSTEMS
Filed Dec. 7, 1949 2 Sheets-Sheet 1

Inventor:
Burnice D. Bedford,
by Paul A. Frank
His Attorney.

April 10, 1951  B. D. BEDFORD  2,548,579
CONTROL CIRCUITS FOR ELECTRIC CONVERTING SYSTEMS
Filed Dec. 7, 1949  2 Sheets—Sheet 2

Inventor:
Burnice D. Bedford,
by Paul A. Frank
His Attorney.

Patented Apr. 10, 1951

2,548,579

UNITED STATES PATENT OFFICE 2,548,579

CONTROL CIRCUITS FOR ELECTRIC CONVERTING SYSTEMS

Burnice D. Bedford, Scotia, N. Y., assignor to General Electric Company, a corporation of New York Application December 7, 1949, Serial No. 131,650

1 Claim. (Cl. 321—11)

My invention relates to electric converting systems of the type employing as circuit interrupting devices either electron discharge devices or mechanical switching contacts. More particularly, my invention relates to circuits for controlling the initial inverse voltage appearing across such circuit interrupting devices following commutation.

It has been found in electric converting systems that the occurrence of so-called "arc-backs," namely, the flow of current through a circuit interrupting device in a direction opposite to the normal direction of current flow and occurring during the period when the interrupting device is intended to be nonconductive, is a function of the rate of change of current flowing through the interrupting device in the normal direction during the period of conduction, and the inverse voltage impressed across the interrupting device following commutation. In my United States Patent No. 2,126,603, granted August 9, 1938 and assigned to the same assignee as the present invention, there is disclosed a circuit wherein a reactor, which may be of the saturable type, is employed to control the rate of change of current through an electron discharge interrupting device at the end of the conducting period and during the commutation period. In particular, a substantial increase in the inductance of a series winding is effected near or at the end of the conducting period so that the rate of change of current through electron discharge device is reduced to a value below the value which, for the particular electron discharge device employed, causes arc-backs to occur. In my United States Patent No. 2,284,794, granted June 2, 1942 and assigned to the same assignee as the present invention, there is disclosed a similar method of controlling the rate of change of current in a converting system employing mechanical switching devices.

While the control of the rate of change of the current flowing through a circuit interrupting device at the end of the conducting period is of obvious great advantage in the reduction to a minimum of the number of arc-backs occurring in a converting system, it is desirable in certain applications to permit the rate of change to be relatively great in order to reduce the current to its minimum value as rapidly as possible. In such cases, it is advantageous to cause the initial inverse voltage appearing across the circuit interrupting device following commutation to be held to a value below the value which, for the particular interrupting device employed, causes arc-backs to occur.

The circuits of my two above-named United States patents provide for control of one of the two closely related factors which affect the occurrence of arc-backs in electric converting systems, namely, the rate-of-change of current in the normal direction through a circuit interrupting device. My present invention additionally provides for control of the other of these two closely related factors, namely, the initial inverse voltage appearing across a circuit interrupting device following commutation.

Accordingly, it is an object of my present invention to provide an improvement for the circuits disclosed in my two above-named United States patents.

It is another object of my invention to provide, in electric converting systems, an improved circuit for controlling the initial inverse voltages appearing across the circuit interrupting devices therein following commutation.

My invention applies especially to electric converting systems of the type having saturable reactor windings connected in series relation with the circuit interrupting devices thereof. In particular, I provide impedances, preferably including a substantial proportion of resistance, connected across such windings for the purpose of controlling the rate of change of flux in the saturable reactors, and hence the voltages induced in the reactor windings, as the currents to be interrupted decrease to their minimum or zero values.

Figure 2:
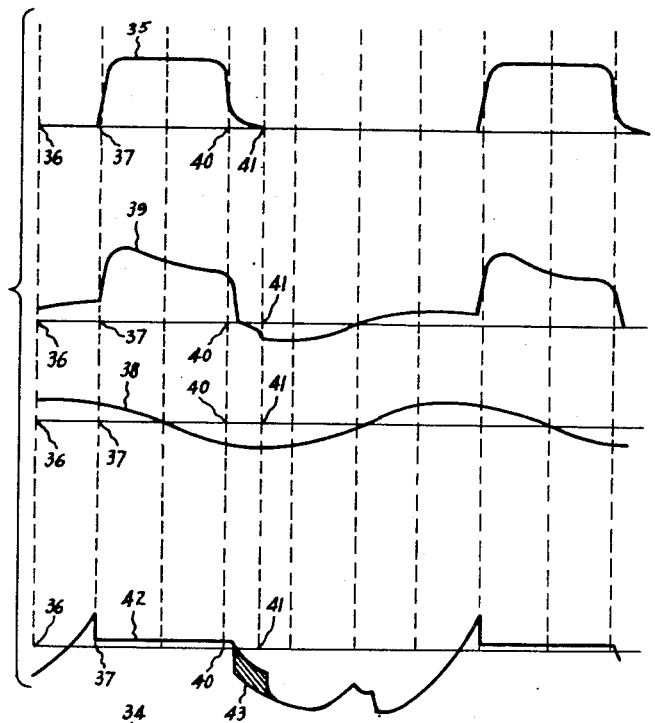
Figure 3:
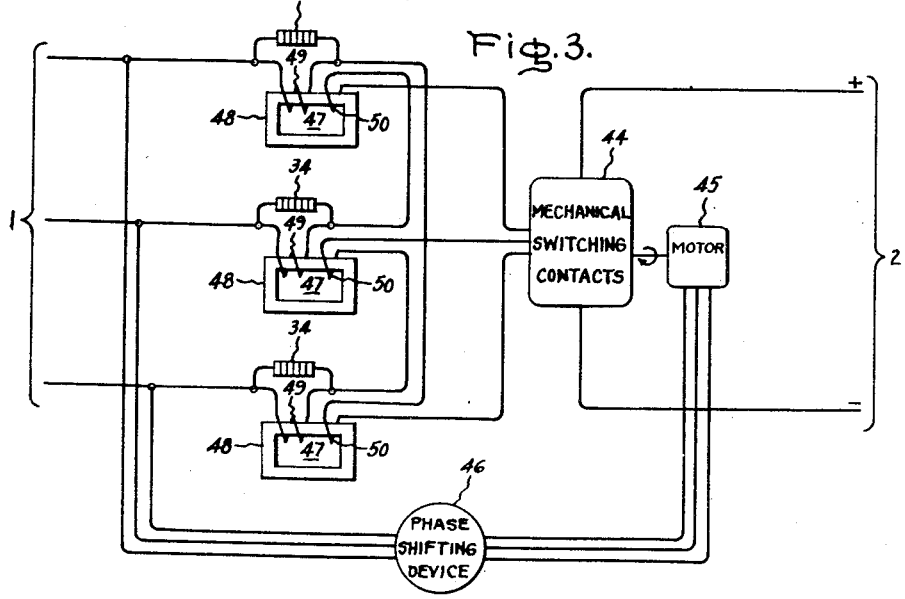

For a better understanding of my invention, attention is now directed to the following description and the figures of the accompanying drawing, and also to the appended claim in which the features of my invention believed to be novel are set forth. Fig. 1 diagrammatically illustrates an embodiment of my invention as applied to an electric converting system employing electron discharge devices; Fig. 2 is a curve illustrating certain operating characteristics of the embodiment shown in Fig. 1; and Fig. 3 diagrammatically illustrates another embodiment of my invention as applied to an electric converting system employing mechanical switches.

Referring to Fig. 1, there is shown diagrammatically an embodiment of my invention as applied to an electric converting system for transmitting power from a three-phase alternating current source 1 to a direct current load circuit 2 through a transformer 3 and interphase transformer 4, and through electron discharge devices 5—10, preferably of the type having an ionizable medium such as a gas or vapor. The conductivity of electron discharge devices 5—10 may be controlled by means of any conventional excitation or control circuit such as the excitation circuit 11 having a phase shifting arrangement, such as a rotary phase shifter 12, a transformer 13, current limiting resistances 14, and any suitable source of biasing potential, such as a battery 15.

In order to control the current through the electron discharge devices at the end of the conduction period, I provide saturable reactors 16—18, having windings 19—24 connected respectively in series relation with electron discharge devices 5—10. Presaturation of saturable reactors 16—18 prior to the respective conducting periods of electron discharge devices 5—10 is effected by means of a presaturating circuit 25 having a transformer 26, current limiting reactors 27, and control windings 28—30, respectively, of saturable reactors 16—18.

Electron discharge devices 5—10 are rendered alternately conductive and nonconductive to effect full-wave rectification of the alternating current supplied by source 1.

The current conducted by electron discharge device 5 may be represented by curve 35 of Fig. 2. During the interval 36—37, no current is conducted by electron discharge device 5. However, the current in presaturating winding 28 of saturable reactor 16, represented by curve 38, causes a magnetomotive force to be impressed on the magnetic core 31 of reactor 16 to effect substantial saturation thereof. The impedance of series winding 19 of reactor 16 is therefore relatively small, and the current which starts to flow in electron discharge device 5 at point 37 of curve 35 is allowed to increase rapidly. This current flowing in winding 19 of reactor 16 causes an additional magnetomotive force to be impressed on core 31.

The total magnetomotive force impressed on core 31 is represented by curve 39 of Fig. 2. At point 40 of curve 35, the current in electron discharge device 5 begins to decay causing a decrease and subsequent reversal of the magnetomotive force impressed on core 31. Hence, during the interval 40—41, core 31 becomes desaturated, causing a substantial increase in the inductance of the winding 19 and causing the current flowing in electron discharge device 5 and winding 19 to decay at a relatively slow rate as described in my aforementioned United States Patent No. 2,126,603. Following desaturation, core 31 is again saturated, but in a sense opposite to its previous condition of saturation. During the reversal of saturation of core member 31, a reversal of flux occurs therein causing a voltage to be induced in winding 19 of reactor 16.

Connected in a parallel sense across windings 19—24, respectively, of reactors 16—18, I provide impedances 34 which are preferably resistances having a nonlinear volt-ampere characteristic, such as a resistance material of the type disclosed and claimed in United States Patent No. 1,822,742, granted September 8, 1931, upon application of Karl B. McEachron. The effects of resistances 34 are two-fold. The aforementioned voltage induced in winding 19 by the reversal of flux in core 31 causes a current to be circulated in winding 19 and resistance 34, the reversal of the flux thereby being delayed, permitting the change of flux to continue after the main current flowing in electron discharge device 5 and winding 19 has ceased to flow. The voltage induced in winding 19 appears in the circuit of electron discharge device 5 and winding 19 in an opposite sense to the inverse voltage appearing across the electron discharge device 5 following the period of conduction, thereby subtracting from and causing a net reduction of this inverse voltage, which is most desirable in the prevention of arc-backs.

Resistance 34 further provides a shunt across the inductive impedance of winding 19. Under conditions of saturation of core 31, the impedance of winding 19 is relatively small and therefore the effect on the net impedance of winding 19 and resistance 34, due to resistance 34, is negligible. However, as core 31 becomes desaturated, the impedance of winding 19 becomes relatively great and shunt resistance 34 causes a reduction in the net impedance of the combination of winding 19 and resistance 34 to effect more rapid reduction of the main current flowing in winding 19 and electron discharge device 5.

It will be understood that without the use of resistance 34 the magnitude and duration of the voltage induced in winding 19 by the reversal of magnetomotive force impressed on core 31 are not controllable. According to my invention, however, the duration of the induced voltage is increased, and the inverse voltage is maintained at the highest practicable value to assist in removing positive ions from the ionizable medium without causing arc-backs to occur. In addition, the main current is allowed to decrease more rapidly than would be the case without the use of resistance 34, thereby shortening the conduction period and assisting in rapidly removing the positive ions before the inverse voltage reaches a value sufficient to cause arc-backs. Curve 42 of Fig. 2 represents the voltage impressed across electron discharge device 5. Shaded portion 43 of curve 42 indicates the amount of reduction of the initial inverse voltage.

Fig. 3 of the accompanying drawing represents, partially in block form, another embodiment of my invention as applied to an electric converting system of the type employing mechanical switching contacts as circuit interrupting devices. The embodiment herein represented is substantially the same as the electric converting system represented in Fig. 4 of my United States Patent No. 2,284,794, and its operation is substantially as described therein. Referring now to Fig. 2, it will be seen that the converting system is arranged to transmit energy between a direct current circuit 2 and an alternating current circuit 1. A plurality of mechanical switching contacts 44 are provided which may be, for example, contacts on a drum switch driven in synchronism with the voltage of alternating current circuit 1 by a motor 45 connected thereto through a phase shifting device, such as a rotary phase shifter 46.

To effect control of the currents to be interrupted, a plurality of saturable reactors 47 are provided, these reactors having generally the same function as reactors 16, 17, and 18 in the arrangement of Fig. 1. Each of the reactors 47 has a core member 48, and is provided with a main winding 49 and a control winding 50. Windings 49 and 50 are suitably cross-connected, as explained in my above-mentioned patent, to cause saturation of core members 48 and reduction of the currents to be interrupted at the desired times. As in the arrangement of Fig. 1, I provide a resistance 34, preferably of the type having a nonlinear volt-ampere characteristic, connected in parallel across each of the main reactor windings 49. The use of resistances 34 in the arrangement of Fig. 2 permits control of the magnitude and duration of the voltages induced in the windings 49, with substantially the same results and advantages as those described above in connection with the arrangement of Fig. 1.

In the embodiments of my invention herein disclosed, I have chosen to show resistances 34 of Fig. 1 and Fig. 3 as being connected across the main windings of the saturable reactor devices included in the converting systems. Thus, in the arrangement of Fig. 1, resistances 34 are shown connected across windings 19—24, and in Fig. 3 resistances 34 are shown connected across windings 49. It will be understood, however, that resistances 34 could equally well be connected across control windings 28—30 of Fig. 1 or windings 50 of Fig. 3. Since the main and control windings of the reactors are inductively associated, effects in either winding are transferred to the other by transformer action. The choice of location of these resistances, therefore, is primarily a matter of convenience.

Although I have chosen to represent my invention as applied to systems employing particular types of circuit interrupting devices, it should be understood that my invention may be applied to systems in which other types of circuit interrupting devices are employed. It should be further understood that my invention may be applied to electric converting circuits generally where it is desired to transmit energy in either direction between alternating current circuits and direct current circuits, or between alternating current circuits of the same or different frequencies.

While I have shown and described my invention as applied to a particular system of connections and as embodying various devices diagrammatically shown, it will be obvious to those skilled in the art that changes and modifications may be made without departing from my invention, and I therefore aim in the appended claim to cover all such changes and modifications as fall within the true spirit and scope of my invention.

What I claim as new and desire to secure by Letters Patent of the United States is:

In an electric converting system, a supply circuit, a load circuit, and a converting apparatus interposed therebetween including a plurality of circuit interrupting devices, means to render said devices conductive during predetermined intervals, and means for controlling the current conducted by said circuit interrupting devices comprising a plurality of saturable reactors each having a main winding connected in series with one of said interrupting devices and an auxiliary winding to control the inductance of said main winding and connected in series with another of said interrupting devices, and a plurality of resistances having nonlinear volt-ampere characteristics, one of said resistances being associated with each of said reactors, said resistances being connected across corresponding windings of said reactors to control the duration and magnitude of the voltages induced in said main windings following circuit interruptions by said interrupting devices.

BURNICE D. BEDFORD.

REFERENCES CITED

The following references are of record in the file of this patent:

UNITED STATES PATENTS

| Number | Name | Date |
|---|---|---|
| 1,961,197 | Churchward | June 5, 1934 |
| 2,038,505 | Winograd | Apr. 21, 1936 |